United States Patent
Kawachi

(10) Patent No.: US 8,684,206 B2
(45) Date of Patent: Apr. 1, 2014

(54) RUBBER PLUG FOR A VIAL CONTAINER HAVING CONCAVO-CONVEX CONNECTING PORTIONS

(71) Applicant: Daikyo Seiko, Ltd., Tokyo (JP)

(72) Inventor: Yasushi Kawachi, Tokyo (JP)

(73) Assignee: Daikyo Seiko Ltd., Tokyo (JP)

( * ) Notice: Subject to any disclaimer, the term of this patent is extended or adjusted under 35 U.S.C. 154(b) by 0 days.

(21) Appl. No.: 13/678,003

(22) Filed: Nov. 15, 2012

(65) Prior Publication Data

US 2013/0119011 A1    May 16, 2013

(30) Foreign Application Priority Data

Nov. 16, 2011  (JP) .................................. 2011-250611

(51) Int. Cl.

| | |
|---|---|
| B65D 39/00 | (2006.01) |
| B29C 43/02 | (2006.01) |
| B29C 43/14 | (2006.01) |
| B29C 43/20 | (2006.01) |
| B29C 45/02 | (2006.01) |
| B29C 45/14 | (2006.01) |
| B65D 51/00 | (2006.01) |

(52) U.S. Cl.
CPC ............. *B65D 39/00* (2013.01); *B29C 43/021* (2013.01); *B29C 43/146* (2013.01); *B29C 43/203* (2013.01); *B29C 45/02* (2013.01); *B29C 45/14* (2013.01); *B65D 51/005* (2013.01)
USPC ......................................... 215/355; 264/255

(58) Field of Classification Search
USPC ........... 215/355, 364, 247; 220/DIG. 19, 801; 428/36.8, 35.7; 138/89; 217/110, 113; 264/255, 268
See application file for complete search history.

(56) References Cited

U.S. PATENT DOCUMENTS

| | | | | |
|---|---|---|---|---|
| 768,391 | A * | 8/1904 | Montaner ...................... | 215/364 |
| 2,397,500 | A * | 4/1946 | Merker et al. ............. | 285/141.1 |
| 5,078,941 | A * | 1/1992 | Tatsumi et al. ............... | 264/161 |
| 5,217,668 | A * | 6/1993 | Matsuzaki et al. ........... | 264/161 |
| 5,484,566 | A * | 1/1996 | Gabbard ....................... | 264/250 |
| 6,165,402 | A * | 12/2000 | Gabbard et al. .............. | 264/255 |
| 6,604,561 | B2 * | 8/2003 | Py ................................. | 141/329 |

FOREIGN PATENT DOCUMENTS

| | | |
|---|---|---|
| EP | 1 020 277 A1 | 7/2000 |
| JP | 2005-297432 A | 10/2005 |
| JP | WO 2009/051282 | 4/2009 |
| JP | 2009-538258 A | 11/2009 |
| WO | WO 2009-151129 A1 | 12/2009 |

OTHER PUBLICATIONS

European Patent Office, "Extended European Search Report for EP 12192718.0-1707", Mar. 1, 2013.

* cited by examiner

*Primary Examiner* — J. Gregory Pickett
*Assistant Examiner* — Ernesto Grano
(74) *Attorney, Agent, or Firm* — Manabu Kanesaka

(57) ABSTRACT

A rubber plug for a vial container includes a leg portion press molded independently, and having a base end side portion, and a plate-shape cap portion bonded to the base end side portion press-molded with the leg portion. The leg portion and the plate-shape cap portion have bonding areas formed as concentric concavo-convex areas. The base end side portion of the leg portion including the area bonded with the plate-shape cap portion is formed of a material same as that of the plate-shape cap portion. A remaining portion of the leg portion except for the base end side is formed by a material different from the plate-shape cap portion.

5 Claims, 8 Drawing Sheets

US 8,684,206 B2

RUBBER PLUG FOR A VIAL CONTAINER HAVING CONCAVO-CONVEX CONNECTING PORTIONS

RELATED APPLICATIONS

The present application is based on, and claims priority from, Japanese Application No. JP2011-250611 filed Nov. 16, 2011, the disclosure of which is hereby incorporated by reference herein in its entirety.

TECHNICAL FIELD

The present invention relates to a rubber plug for a vial container for sealing an opening section of the vial container.

BACKGROUND ART

A plug body for sealing the opening section of the vial container for containing liquid medicinal chemicals is required to have a number of quality performances, e.g., a good capping property, a high sealing ability, a high gas barrier property, a high chemical resistance, a high needle-stick resistance and a low reactive property. As a plug body which satisfies these required properties, so called rubber plug has been generally used because of the excellent elasticity.

Among this type of rubber plugs for vial containers, a rubber plug for a vial container which contains medicinal chemicals needs to have quality properties which comply with a test method for an infusion rubber plug which is described in the 16$^{th}$ revised Japanese Pharmacopoeia. In particular, such a rubber plug needs to pass an eluted substance test for one hour at 121° C. using a high pressure steam sterilizer which requires a high heat resistance.

As a material for a rubber plug for a vial container which meets the requirement, synthetic rubber like butyl rubber or isoprene rubber, styrene thermoplastic elastomer like SEBS and thermoplastic elastomer which comprises polyisobutylene or polybutadiene as a major constituent have been conventionally utilized (see Patent Document 1).

In general, a rubber plug for a vial container is formed so as to have a thick discoid cap portion and a thick cylindrical leg portion. The cylindrical leg portion has a diameter which is smaller than that of the cap portion and protrudes from the bottom surface of the cap portion. The lower surface of the flange of the discoid cap portion can closely contact with the end surface of the opening section of the vial container by driving the cylindrical leg portion into the inner periphery of the opening section of the vial container.

This type of rubber plugs for vial containers is generally known as rubber plugs having different materials between the discoid cap portion and the cylindrical leg portion as described below by using a two step molding method including a first step for press molding a cylindrical leg portion alone and a second step for press molding a discoid cap portion integral with the cylindrical leg portion after the first step (see Patent Documents 2 and 3).

That is to say, the leg portion is formed by silicone rubber mixed with elastomer which does not become hard even at extremely-low temperatures, and the cap portion is formed by butyl rubber having a high gas barrier performance and a good coring property.

Additionally, as shown in FIG. 8, it is known to form a convex section 1B' having a trapezoidal shape in cross section at the connected portion between a cylindrical leg portion 1B and a discoid cap portion 1A, and form a concave portion 1A' at the discoid cap portion 1A to fit to the convex portion 1B.

PRIOR ART REFERENCES

Patent Document 1: Japanese Laid-open Patent Application No. 2009-538288 (Japanese Patent Re-Publication No. 2009/051282)
Patent Document 2: WO2009-151129
Patent Document 3: Japanese Laid-open Patent Application No. 2005-297432

DISCLOSURE OF INVENTION

Problems to be Resolved by the Invention

It is difficult to perfectly bond the discoid cap portion with the cylindrical leg portion because their materials are different in a rubber plug for a vial container made by a two-step molding method shown in the aforementioned Patent Document 3. Therefore, there is a risk of detachment at the bond part between the discoid cap portion and the cylindrical leg portion if a high tension is applied between the cap portion and the leg portion, for example, when a vial container storing liquid medicinal chemicals by freezing preservation is taken out to a condition at normal temperature.

Additionally, under a severe usage environment, there is a risk of detachment between the cap portion and the leg portion or a crack in a rubber plug having a structure shown in FIG. 8.

This invention is made in order to resolve the above described problems. An object of the present invention is to provide a rubber plug for a vial container in which a cap portion and a leg portion are solidly bonded to each other by a two-step molding method, wherein the cap portion has a roughly plate-like shape, e.g. a discoid shape, a triangular plate shape, a rectangular plate shape, and the leg portion has a cylindrical shape, a columnar shape or a tabular shape.

Means for Solving the Problems

In order to solve the problems, a rubber plug for a vial container according to the present invention is a rubber plug for a vial container comprising a leg portion which is formed by press molding independently and a plate-like cap portion which is bonded to the base end side portion of the leg portion by press molding integral with the leg portion, wherein the bonding surface between the leg portion and the plate-like cap portion is formed as a concentric concavo-convex surface, the base end side portion of the leg portion including the surface bonded to the plate-like cap portion is formed by the same material as that of the plate-like cap portion, and the remaining portion of the leg portion which is not at the base end side is formed by a material which is different from that of the plate-like cap portion.

In a rubber plug for a vial container according to the present invention, a plate-like cap portion is solidly bonded to the base end side of a leg portion through a synergistic effect of a mechanical bonding by the concavo-convex surface and a high affinity by the same material, when the plate-like cap portion is press molded integrally with the base end side portion of the leg portion by a two-step molding method, because the bonding surface between the leg portion and the plate-like cap portion is formed as a concentric concavo-convex surface and the base end side portion of the leg portion including the surface bonded to the plate-like cap portion is formed by the same material as that of the plate-like cap portion. Therefore, the rubber plug for a vial container according to the present invention is suitable to be a rubber plug for a vial container which stores liquid medicinal chemicals by freezing preservation, for example.

In the leg portion of the rubber plug for the vial container according to the present invention, the portion which is not at the base end side contacting with a plate-like cap portion can be formed by butyl rubber, for example.

The butyl rubber is not limited to a specific type as long as it is a butyl rubber or butyl rubber based composition which is generally used as a sealing member for a medicinal or medical container and which has a hardness (JIS type A) in a range between 20 and 40, and has a geass-transition temperature in a range between −30° C. and −60° C. Examples of the butyl rubber include regular butyl rubber, butyl halide (brominated, chlorinated) rubber, brominated isobutylene-para-methylstyrene, cross-linked isobutylene-isoprene-divinylbenzene ternary copolymer, etc. It is suitable to use regular butyl rubber, butyl halide rubber or compounded rubber based on one of these rubbers in view of a high barrier property, a good elusion characteristic and a good coring property.

Additionally, the base end side portion of the leg portion and the plate-like cap portion which contacts with the base end side portion can be made by elastomer compounded silicone rubber or elastomer compounded butadiene rubber, for example. It is preferable to use elastomer compounded rubber having a hardness (JIS type A) in a range between 40 and 60, and a glass-transition temperature in a range between −100° C. and −150° C. For example, it is suitable to use elastomer compounded rubber comprising the base rubber like silicone rubber or butadiene rubber of 100 pts.wt and the compounded elastomer in a range between 80 pts.wt and 210 pts.wt, preferably in a range between 100 pts.wt and 150 pts.wt. By using this range of compounding ratio, it is possible to maintain good rubber elasticity under extremely-low temperature and a good characteristic regarding elusion from the rubber.

Although the aforementioned silicone rubber is not limited to a specific type as long as it is silicone rubber which is generally used as a sealing member for a medicinal or medical container. Examples of the silicone rubber include organosiloxane rubber, more specifically methyl silicone rubber, vinyl methyl silicone rubber, phenyl silicone rubber, fluoro silicone rubber, phenylmethyl silicone rubber, most preferably phenylmethyl silicone rubber having a phenyl group in a side chain of a silicone polymer.

Similarly, although the aforementioned butadiene rubber is not limited to a specific type as long as it is butadiene rubber which is generally used as a sealing member for a medicinal or medical container. More specific examples of the butadiene rubber include butadiene rubber, styrene butadiene rubber and nitrile butadiene rubber. It is most preferable to use butadiene rubber in view of a high gas barrier property, a low elusion characteristic and a high sealing property.

In general, the elastomer which is mixed with the aforementioned base rubber is a type which has an effect(function) for setting the hardness of the elastomer compounded rubber to the most preferable value (specifically, the aforementioned hardness), and according to the present invention, it includes thermoplastic elastomer, synthetic rubber and a combination of the thermoplastic elastomer and the synthetic rubber.

Examples of the thermoplastic elastomer include polyisobutylene thermoplastic elastomer (SIBS), styrene elastomer like styrene-butadiene-styrene (SBS) copolymer, styrene-ethylenebutylene-styrene (SEBS) copolymer, styrene-isoprene-styrene (SIS) copolymer, ethylene-propylene-unconjugated diene monomer (EPDM) copolymer, and ethylene-propylene (EPM) copolymer, and it is suitable to use polyisobutylene thermoplastic elastomer (SIBS) in view of a high gas barrier property.

Examples of the synthetic rubber include acrylic rubber (ACM), acrylic nitrile butadiene rubber (NBR), isoprene rubber (IR), butadiene rubber (BR), styrene-butadiene rubber (SBR), butyl rubber (IIR), and it is suitable to use butadiene rubber (BR) in view of a compounding property with silicone rubber, a formability, an anti-coring performance, improvement of coefficient of elasticity, and physical properties like permanent distortion and elongation.

It is only necessary to use at least one kind of material selected from each of the thermoplastic elastomer group and the synthetic rubber group for compounding.

It is obviously preferable to use materials having a property of solidly bonding the base end side portion of the leg portion with a remaining portion which is not at the base end side by press molding, wherein the base end side portion comprises elastomer compounded silicone rubber or elastomer compounded butadiene rubber, and the remaining portion comprises butyl rubber. The base end side portion and the remaining portion are bonded to become a substantially integrated member by press molding through a two-step molding method according to the present invention. At a first step, a leg portion is formed by using the base end side portion of the leg portion comprising a sheet-like rubber member and the remaining portion which is not at the base end side comprising a sheet-like rubber member, and then, at a second step, a plate-like cap portion is formed and the cap portion is bonded with the leg portion by putting a sheet-like rubber member constituting the plate-like cap portion on the leg portion.

It is obviously possible to replace the material for the base end side portion of the leg portion with the material for the remaining portion which is not at the base end side, constitute the base end side portion of the leg portion by butyl rubber or a butyl rubber based composition, and constitute the remaining portion which is not at the base end side by elastomer compounded silicone rubber or elastomer compounded butadiene rubber.

Additionally, it is possible to insert a film between the aforementioned two rubber members for bonding the two rubber members with each other, wherein the film is a polyethylene film of a molecular weight in a range between 1,000,000 and 7,000,000, preferably in a range between 1,500,000 and 6,000,000 (hereinafter, referred as an "ultra-high molecular weight polyethylene film"). The thickness of the ultra-high molecular weight polyethylene film is arbitrary chosen in a range between 20 μm and 200 μm depending upon the application and size of a rubber plug because it is difficult to achieve a uniform bonding strength and an efficient gas barrier property if it is too thin and there is a risk of inducing increased hardness and generation of coring if it is too thick.

When the film is inserted, it is possible to prepare a laminated body of two rubber sheets and the film inserted therebetween, and then a leg portion is formed by press molding the laminated body or inserting the film between two rubber sheets when the rubber sheets are set in a press molding equipment for forming a leg portion, and a leg portion is formed by press molding these sheets.

Effect of Invention

In the rubber plug for the vial container according to the present invention, the plate-like cap portion is solidly bonded to the base end side portion of the leg portion through the synergistic effect of the mechanical bonding by the concavo-convex surface and the high affinity by the same material of the bonding surface, when the plate-like cap portion is press molded integrally with the base end side portion of the leg portion by the two-step molding method, because the bonding surface between the leg portion and the plate-like cap portion is formed as a concentric concavo-convex surface and the base end side portion of the leg portion is formed by the same material as that of the plate-like cap portion.

Even if a combination of materials which does not have a good adhesive property between the materials which are used for the material constituting the cap portion and the material constituting the leg portion, according to the present invention, as described above, it is possible to realize a very solid bond because of a synergy of the mechanical bond by concavity and convexity and the high affinity bond by the same material for both the base end side portion of the leg portion and the cap portion.

Therefore, in the rubber plug for the vial container according to the present invention, it is possible to achieve a solid bond because the plate-like cap portion and the base end side portion of the leg portion comprise elastomer compounded silicone rubber or elastomer compounded butadiene rubber, and the remaining portion of the leg portion which is not at the base end side comprises butyl rubber or a butyl rubber based compound, and furthermore it is possible to maintain an efficient function as the rubber plug even if an extremely-low temperature liquid contacts with the leg portion when the liquid is stored in a vial container for freezing preservation because the contacting portion of the leg portion is made of a rubber material having a high cold resistance.

As described above, in the rubber plug for the vial container according to the present invention, it is possible to maintain an efficient function as a rubber plug because the rubber material having a high cold resistance (no disturbed rubber elasticity and no degradation of the rubber material itself under extremely-low temperatures) is used and the cap portion is bonded with the leg portion quite solidly, even if it is attached to a vial container and put under an extremely-low temperature atmosphere for freezing preservation, for example, even if it is taken from an extremely-low temperature atmosphere out under a normal temperature atmosphere, or even if the freezing preservation and the removal to the normal temperature atmosphere are repeated.

DETAILED DESCRIPTION OF THE INVENTION

Figure 1:
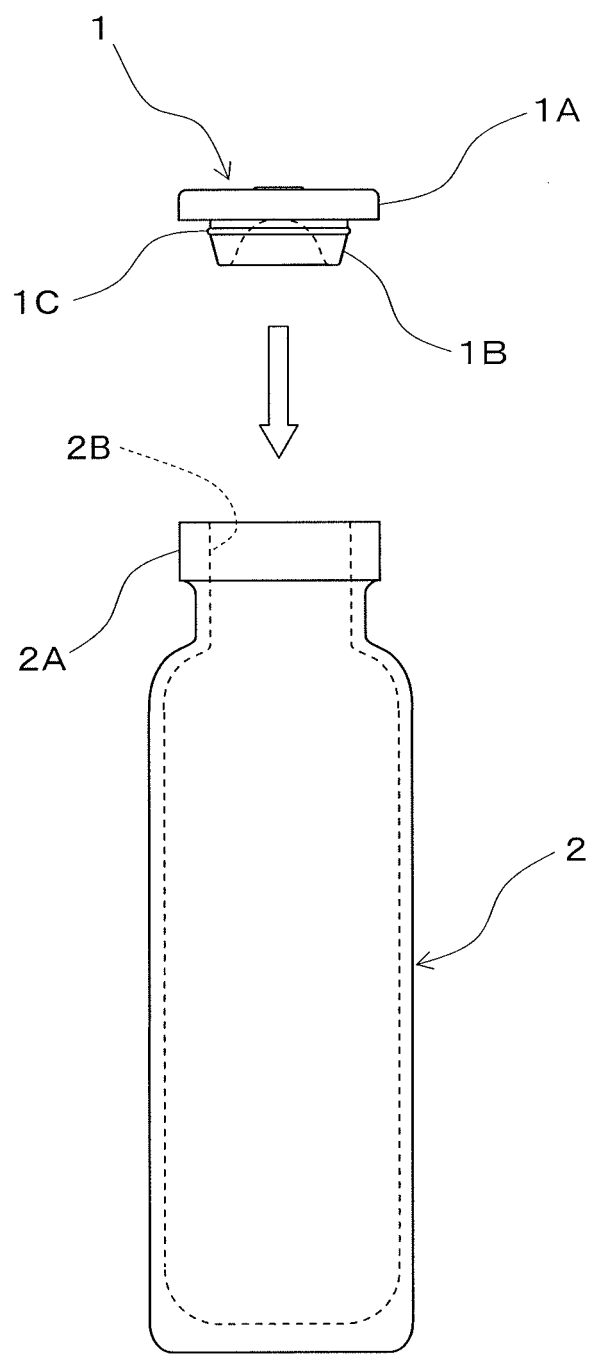
FIG. 1 shows a front view of a rubber plug for a vial container according to one embodiment of the present invention and an exemplary vial container.
Figure 2:
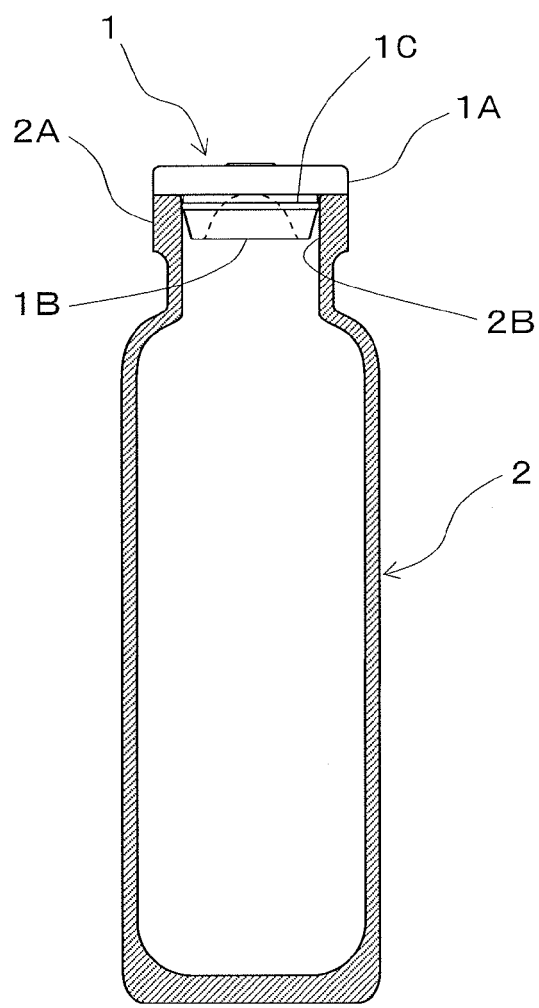
FIG. 2 shows a longitudinal sectional view of the rubber plug for the vial container shown in FIG. 1 which was driven into the opening section of an exemplary vial container.

Embodiments of a rubber plug for a vial container according to the present invention will be described below referring to the attached drawings. As shown in FIGS. 1 and 2, a rubber plug for a vial container 1 according to one embodiment is used to seal the opening section of a vial container 2 in which liquid medicinal chemicals are filled, for example, and caps a ring-like lip portion 2A which is formed at the opening section of the vial container 2 using a capping equipment which is not shown in the drawings.

The rubber plug for the vial container 1 has a thick leg portion 1B concentrically protruding from the bottom surface of a thick discoid cap portion 1A and having a diameter which is smaller than that of the cap portion 1A. A sealing portion 1C is integrally formed on the outer periphery of the base end portion of the leg portion 1B. The leg portion 1B has a tapered outer periphery from the sealing portion 1C toward the tip.

The rubber plug for the vial container 1 having such a shape seals the opening section of the vial container 2 by driving and fitting the leg portion 1B into an inner periphery 2B of a ring-like lip portion 2A of the vial container 2 so that the sealing portion 1C is closely attached to the inner periphery 2B of the ring-like lip portion 2A and the bottom surface of the flange portion of the discoid cap portion 1A is closely attached to the top surface of the ring-like lip portion 2A (see FIG. 2).

The size of the rubber plug for a vial container 1 is determined based on the diameter of the opening section of the vial container 2. The maximum diameter (outer diameter) of the leg portion 1B is set to 15 mm, for example, and the maximum diameter of the discoid cap portion 1A is set to 20 mm, for example. The maximum thickness of the discoid cap portion 1A is 3 mm, for example, and the height of the rubber plug for the vial container 1 including the length of the protrusion of the leg portion 1B is 8 mm, for example.

Figure 3:
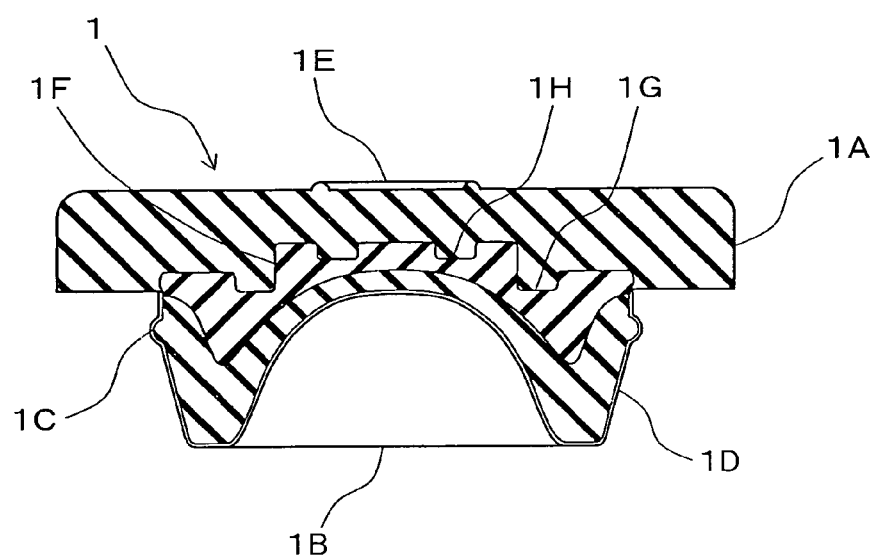
FIG. 3 shows an enlarged longitudinal sectional view of the rubber plug for the vial container shown in FIG. 1.
Figure 4:
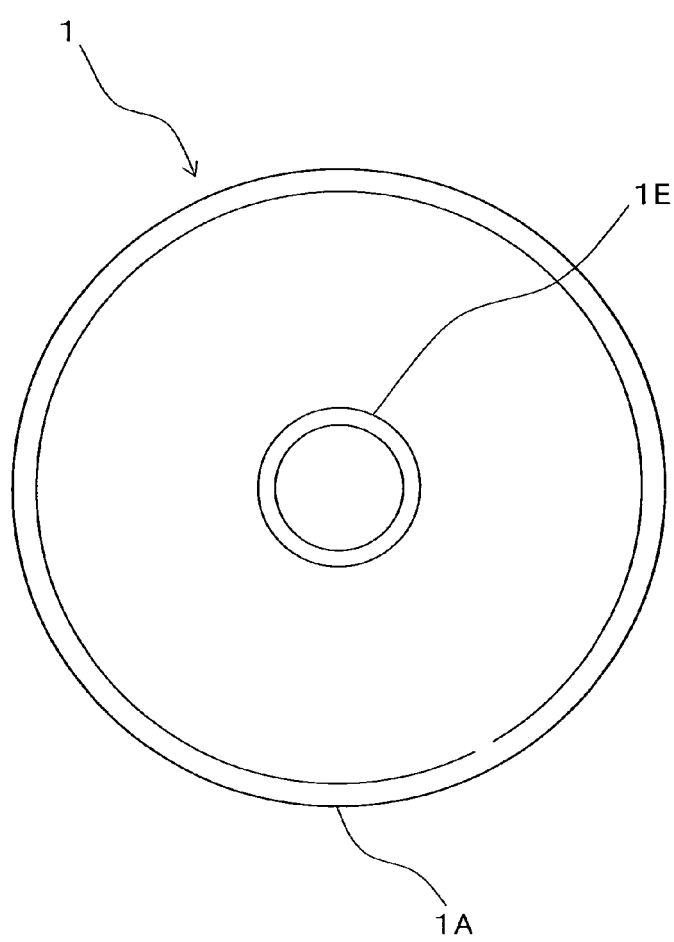
FIG. 4 shows an enlarged plan view of the rubber plug for the vial container shown in FIG. 1.

As shown in the enlarged view of FIG. 3, a base rubber material is exposed on the surface of the discoid cap portion 1A of the rubber plug for the vial container 1, and the surface of the leg portion 1B is coated by a synthetic resin film 1D. Additionally, as shown in the enlarged view of FIG. 4, a ring-like target mark 1E protrudes from the center portion on the top surface of the discoid cap portion 1A which constitutes the top surface of the rubber plug for the vial container 1 as a target for needle sticking so as to have a semicircular shape in cross-section.

Figure 5:
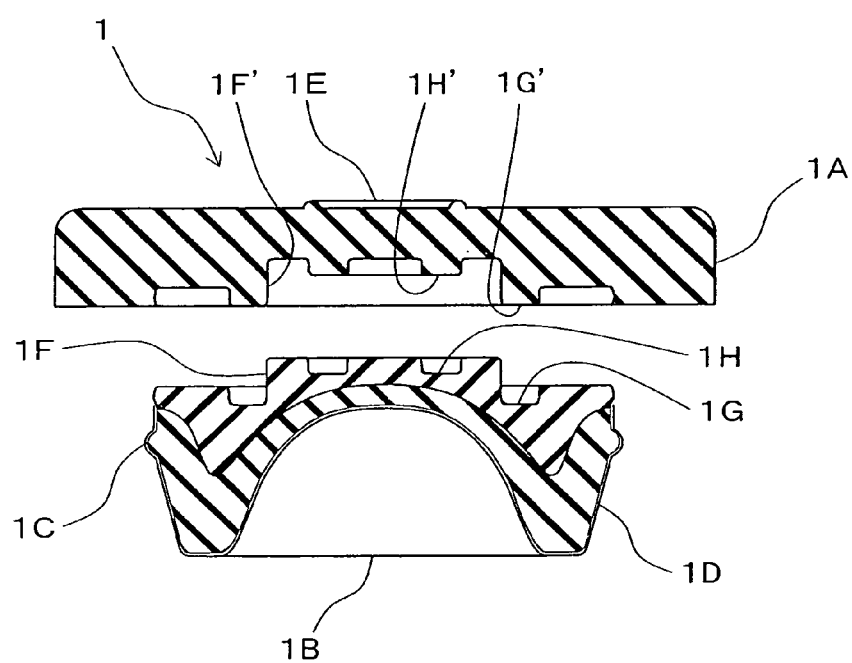
FIG. 5 shows an enlarged longitudinal sectional view of the rubber plug for the vial container shown in FIG. 1 knocking down to the leg portion and the discoid cap portion.

The rubber plug for the vial container 1 is formed by press molding the leg portion 1B independently, and then press molding the discoid cap portion 1A integral with the leg portion 1B using a co-called two-step molding method. That is to say, as shown in the exploded view of FIG. 5, the rubber plug for the vial container 1 is formed by press molding and stamping out the leg portion 1B integral with the synthetic resin film 1D, and then press molding the discoid cap portion 1A integral with the leg portion 1B using a mold in which the leg portion 1B is loaded.

Here, the bonding surface between the discoid cap portion 1A and the leg portion 1B of the rubber plug for the vial container 1 has a concentric concavo-convex surface. That is to say, a boss portion 1F protruding toward the side of the discoid cap portion 1A is formed on the bonding surface at the base end side of the leg portion 1B, a ring-like groove 1G having a larger diameter is formed in the surrounding area of the boss portion 1F, a ring-like groove 1H having a smaller diameter is formed on the end surface of the boss portion 1F, a ring-like groove 1F' which fits to the boss portion 1F is formed on the bonding surface of the discoid cap portion 1A, a boss portion 1G' having a larger diameter and fitting to the ring-like groove 1G having a larger diameter is formed, and a boss portion 1H' having a smaller diameter and fitting to the ring-like groove 1H having a smaller diameter is formed inside the ring-like groove 1F'. The discoid cap portion 1A is press molded integrally with the bonding surface side of the leg portion 1B having the aforementioned concentric concavo-convex surface.

The discoid cap portion 1A comprises elastomer compounded silicone rubber or elastomer compounded butadiene rubber, for example. The base end side portion of the leg portion 1B to which the discoid cap portion 1A is integrally press molded, namely the base end side portion having the bonding surface including the boss portion 1F, the ring shaped groove 1G having a larger diameter and the ring shaped groove 1H having a smaller diameter comprise the same material as that of the discoid cap portion 1A. The remaining portion which is not at the base end side of the leg portion 1B comprises a material which is different from that of the discoid cap portion 1A, and for example, it comprises butyl rubber or butyl rubber based compound rubber. Additionally, although it is not shown in the drawings, a film of the aforementioned material can also be inserted between the base end side portion and the remaining portion which is not at the base end side to bond the two portions with each other.

The synthetic resin film 1D which is coated on the surface of the leg portion 1B has a thickness in a range between 0.01 mm and 0.3 mm, preferably in a range between 0.02 mm and 0.2 mm, more preferably in a range between 0.04 mm and 0.15 mm. It is suitable to set the thickness to these ranges because the porosity of the film is low and the level of defectiveness is low. For example, if it is too thin, it becomes difficult to produce and there is a risk of breakage during manufacturing and insufficient product assurance, and if it is too thick, the rigidity of the film becomes too high and the sealing performance and the needlestick performance becomes unsuitable when it is formed as a rubber plug.

As the synthetic resin film 1D, it is preferable to use a film which is inactive, has a high heat resistance and a high chemical resistance, and has a small friction resistance in comparison with rubber materials. An example of such a film is a fluorine resin film. Examples of the fluorine resin film include tetrafluoroethylene resin (PTFE) film, tetrafluoroethylene-perfluoroethylene copolymer (PFA) film, tetrafluoroethylene-hexafluoropropylene copolymer (FEP) film, tetrafluoroethylene-ethylene copolymer (ETFE) film, trichloro trifluoroethylene (PCTFE) film, polyvinylidene fluoride (PVDF) film, and polyvinyl fluoride (PVF) film.

In the rubber plug for the vial container according to one embodiment having the configuration as described above, a boss portion 1F, a ring-like groove 1G having a larger diameter and a ring-like groove 1H having a smaller diameter are formed on the bonding surface at the base end side of a leg portion 1B to which a discoid cap portion 1A is bonded, a ring-like groove 1F', a boss portion 1G' having a larger diameter, a boss portion 1H' having a smaller diameter are formed on the bonding surface of the discoid cap portion 1A, and the bonding surface between the discoid cap portion 1A and the leg portion 1B is formed as a concentric concavo-convex surface. The base end side portion of the leg portion 1B including the bonding surface is formed by the same material as that of the discoid cap portion 1A. Because of this configuration, in the rubber plug for the vial container 1 according to one embodiment, the discoid cap portion 1A is solidly bonded to the base end side portion of the leg portion 1B when the discoid cap portion 1A is press molded integrally with the base end side portion of the leg portion 1B by a two-step molding method. Therefore, the rubber plug for the vial container 1 according to one embodiment is suitable to use as a rubber plug in which multiple materials having a difficulty in bonding each other are necessary to laminate, for example a rubber plug for a vial container which stores liquid medicinal chemicals for freezing preservation. Especially, in the rubber plug for the vial container 1 according to one embodiment, it achieves an effect of more solidly bonding the cap portion and the leg portion because it has multiple concentric ring-like concavo-convex surfaces and additionally there is a difference in height between the multiple concavo-convex surfaces.

Additionally, in the rubber plug for the vial container 1 according to one embodiment, the discoid cap portion 1A and the base end side portion of the leg portion 1B comprises elastomer compounded silicone rubber or elastomer compounded butadiene rubber having a high cold resistance, the remaining portion of the leg portion 1B which is not at the base end side comprises butyl rubber or butyl rubber based compound having a high gas barrier property, and the surface of the portion (the remaining portion which is not at the base end side) of the leg portion 1B comprising butyl rubber or butyl rubber based compound is coated by the synthetic resin film 1D.

Therefore, the rubber plug for the vial container 1 according to one embodiment is suitable as the rubber plug for the vial container for storing extremely-low temperature liquid medicinal chemicals for freezing preservation. And it can prevent the constituent of the material constituting the rubber plug from eluting to the liquid medicinal chemicals contained in the vial container 2 during the freezing preservation and even under normal temperatures.

Furthermore, in the rubber plug for the vial container according to one embodiment, even if a large number of the rubber plugs for vial containers 1 is packed together for storage, they do not adhere to each other because the surface of each leg portion 1B is coated by the synthetic resin film 1D.

The rubber plug for the vial container 1 according to the present invention should not be limited to the aforementioned embodiment. For example, in the leg portion 1B of the rubber plug for the vial container 1 shown in FIG. 3, the ring-like groove 1H which is formed on the end surface of the boss portion 1F can be changed to a circular recess 1J shown in FIG. 6 or the ring-like groove 1H can be omitted as shown in FIG. 7.

Figure 6:
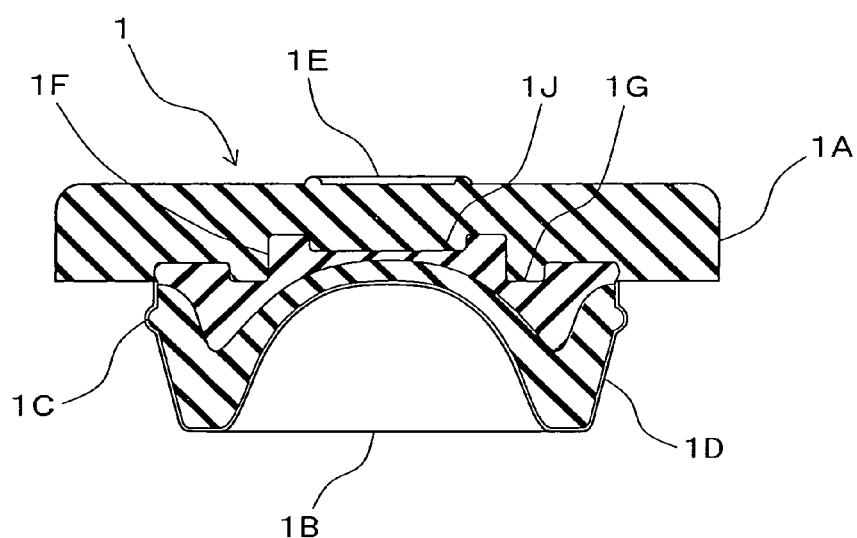
FIG. 6 shows an enlarged longitudinal sectional view of a first modified example for the bonding surface of a rubber plug for a vial container shown in FIG. 3.
Figure 7:
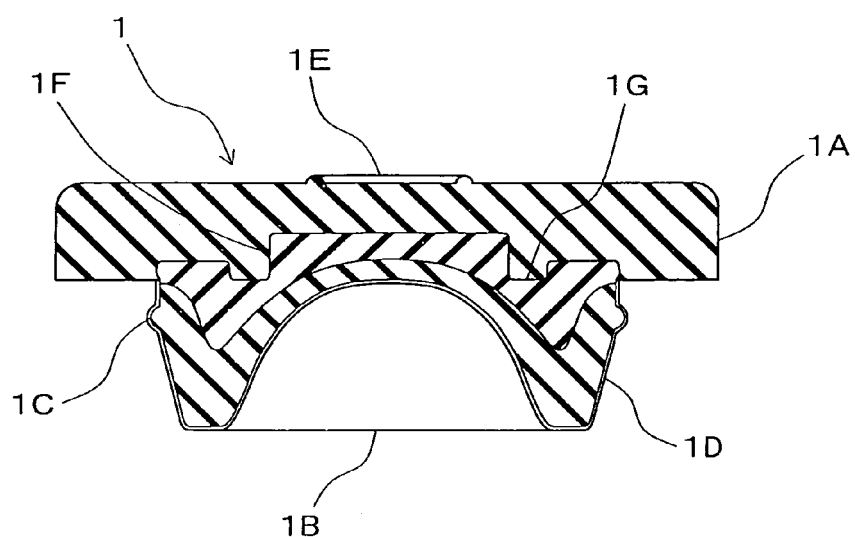
FIG. 7 shows an enlarged longitudinal sectional view of a second modified example for the bonding surface of a rubber plug for a vial container shown in FIG. 3.
Figure 8:
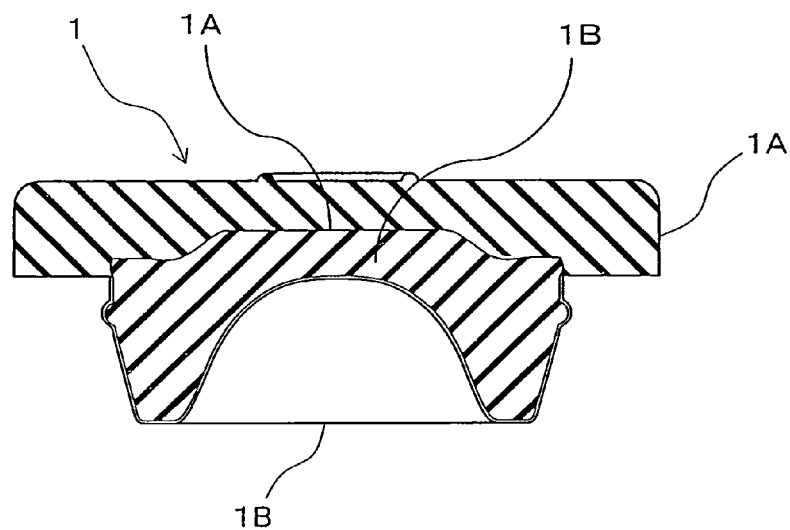
FIG. 8 shows an explanatory drawing for a prior art rubber plug for a vial container.

The rubber plugs of the structures shown in FIGS. 3, 6 and 7 according to embodiments of the present invention and the rubber plug according to the prior art shown in FIG. 8 for comparison were made using the following materials. The discoid cap portion 1A and the base end side portion of the leg portion 1B were constituted by silicone rubber (Product Name "SE955U" made by Dow Corning Toray Co., Ltd.) or butadiene rubber (Product Name "BR18" made by JSR Corporation) mixed with polyisobutylene thermoplastic elastomer (SIBS) (Product Name "SIBSTAR-TPV" made by Kanaka Corporation). The compounding amount of SIBS was set to 20 pts.wt for silicone rubber or butadiene rubber of 100 pts.wt. The remaining portion of the leg portion which is not at the base end side was constituted by butyl rubber (Product Name "Polycer301" made by Polycer Corporation).

The rubber plugs had the following dimensions. The maximum diameter of the discoid cap portion 1A was set to 20 mm, the thickness (maximum thickness) of the discoid cap portion 1A was set to 3 mm, the maximum outer diameter of the leg portion 1B was set to 15 mm, the inner diameter of the leg tip portion was set to 10 mm, and the height of the rubber plug for the vial container 1 including the length of the protrusion of the leg portion 1B was set to 8 mm. Detachment tests and crack tests on these rubber plugs were performed as described below.

<Detachment Test>

An autograph made by Shimadzu Corporation (AG-1, load cell 1 kN) which is not shown in the drawings was used, each of the discoid cap portions 1A of the aforementioned rubber plugs was fixed to a pinching fixture which was set to the load cell, each of the leg portions 1B was pinched and supported by a test pincher, and the pincher was fixed.

In this condition, the pinching fixture set to the load cell was vertically pulled up at a speed of 100 mm/min until the cap portion 1A or the leg portion 1B was fractured or the leg portion 1B was detached from the cap portion 1A. The maximum load value during the pull-up operation was measured and the condition of the rubber plug was observed. The number of tests was set to ten for each rubber plug. The results are shown in Table 1.

<Crack Test>

Ten rubber plugs keeping low temperature and ten rubber plugs keeping normal temperature were driven into vial containers in the condition shown in FIGS. 1 and 2 under a reduced pressure atmosphere (lower than 40 Pa) and were tightened up by using metal (aluminum) caps.

Ten vial containers into which rubber plugs keeping low temperature were driven were kept for 24 hours in an extremely-low temperature tank (−80° C.) in the inverted condition. Ten vial containers into which rubber plugs keeping normal temperature were driven were kept for 24 hours under normal temperature in the inverted condition.

After keeping, the caps were removed from the vial containers and checked whether cracks were found in the rubber plugs. The results are shown in Table 1.

In Table 1, "Example of BR" shows results for examples in which the discoid cap portion and the base end side portion of the leg portion were constituted by SIBS compounded butadiene rubber, and "Example of silicone rubber" shows results for examples in which the discoid cap portion and the base end side portion of the leg portion were constituted by SIBS compounded silicone rubber.

TABLE 1

| | Example of BR | | | |
|---|---|---|---|---|
| | FIG. 3 Embodiment | FIG. 6 Embodiment | FIG. 7 Embodiment | Prior Art |
| | Detachment Test (Kgf) | | | |
| Maximum Load/Status at Maximum Load | 3.68 fractured | 3.48 fractured | 2.84 fractured | 1.95 detached |
| | 3.72 fractured | 3.32 fractured | 2.96 fractured | 1.82 detached |
| | 3.68 fractured | 3.54 fractured | 3.20 fractured | 1.67 detached |
| | 3.48 fractured | 3.28 fractured | 2.74 fractured | 1.94 detached |
| | 3.68 fractured | 3.55 fractured | 3.05 fractured | 1.78 detached |
| | 3.71 fractured | 3.26 fractured | 2.78 fractured | 1.95 detached |
| | 3.56 fractured | 3.47 fractured | 2.84 fractured | 2.04 detached |
| | 3.76 fractured | 3.33 fractured | 3.77 fractured | 1.84 detached |
| | 3.60 fractured | 3.28 fractured | 2.95 fractured | 1.77 detached |
| | 3.85 fractured | 3.36 fractured | 2.89 fractured | 1.92 detached |
| Average Maximum Load | 3.67     0/10 | 3.39     0/10 | 2.91     0/10 | 1.87     10/10 |
| | Crack Test | | | |
| | Normal Temp. / Low Temp. | Normal Temp. / Low Temp. | Normal Temp. / Low Temp. | Normal Temp. / Low Temp. |
| Number of Crack Occurrences | 0     0 | 2     0 | 3     2 | 8     6 |
| | Example of Silicone Rubber | | | |
| | FIG. 3 Embodiment | FIG. 6 Embodiment | FIG. 7 Embodiment | Prior Art |
| | Detachment Test (Kgf) | | | |
| Maximum Load/Status at Maximum Load | 3.08 fractured | 2.63 fractured | 2.32 fractured | 1.66 detached |
| | 2.97 fractured | 2.78 fractured | 2.03 fractured | 1.52 detached |
| | 3.14 fractured | 2.69 fractured | 2.44 fractured | 1.61 detached |
| | 3.08 fractured | 2.96 fractured | 2.25 fractured | 1.63 detached |
| | 2.93 fractured | 2.72 fractured | 2.38 fractured | 1.45 detached |
| | 2.86 fractured | 2.51 fractured | 2.33 fractured | 1.54 detached |
| | 3.12 fractured | 2.73 fractured | 2.18 fractured | 1.65 detached |
| | 3.18 fractured | 2.43 fractured | 2.36 fractured | 1.59 detached |
| | 3.04 fractured | 2.66 fractured | 2.05 fractured | 1.48 detached |
| | 3.02 fractured | 2.58 fractured | 2.48 fractured | 1.71 detached |
| Average Maximum Load | 3.04     0/10 | 2.67     0/10 | 2.28     0/10 | 1.58     10/10 |

TABLE 1-continued

| | \multicolumn{8}{c}{Crack Test} | | | | | | | |
|---|---|---|---|---|---|---|---|---|
| | Normal Temp. | Low Temp. | Normal Temp. | Low Temp. | Normal Temp. | Low Temp. | Normal Temp. | Low Temp. |
| Number of Crack Occurrences | 0 | 0 | 2 | 0 | 3 | 1 | 8 | 7 |

As shown in Table 1, it was found that the rubber plug of the embodiment shown in FIG. 3 had the best performance in terms of the results of the detachment test and the crack test and the performance of the embodiment of FIG. 6 slightly degraded and then the embodiment of FIG. 7 further degraded. In the prior art case shown in FIG. 8, detachment was observed in all rubber plugs.

| | Explanation of the reference numbers |
|---|---|
| 1 | rubber plug for vial container |
| 1A | discoid cap portion |
| 1B | leg portion |
| 1C | sealing portion |
| 1D | synthetic resin film |
| 1E | target mark |
| 1F | boss portion |
| 1G | ring-like groove |
| 1H | ring-like groove |
| 1J | circular recess |
| 2 | vial container |
| 2A | ring-like lip portion |
| 2B | inner periphery |

What is claimed is:

1. A rubber plug for a vial container, comprising:
   a leg portion,
   a base end side portion made of a material different from that of the leg portion and press molded with the leg portion, the base end side portion having, at a side opposite to the leg portion, a convex portion and a ring-shape recess surrounding an outer circumferential side of the convex portion, and
   a cap portion bonded to the base end side portion press-molded with the leg portion, and having a top part, a concave portion on a side opposite to the top part, and a ring-shape projection surrounding the concave portion,
   wherein the convex portion fits into the concave portion and the ring-shape projection fits into the ring-shape recess so that the leg portion and the cap portion are bonded through the base end side portion,
   the base end side portion is formed of a same material as the cap portion, and the leg portion is formed by a material different from the cap portion.

2. A rubber plug for a vial container according to claim 1, wherein the cap portion and the base end side portion comprise elastomer compounded silicone rubber or elastomer compounded butadiene rubber, and
   the leg portion comprises butyl rubber.

3. A rubber plug for a vial container according to claim 1, further comprising a film between the base end side portion and the leg portion,
   wherein the film comprises polyethylene bonding the base end side portion and the leg portion.

4. A rubber plug for a vial container according to claim 1, further comprising a seal ring on a circumferential of the leg portion,
   wherein the seal ring is a ring-shape bulge having a diameter which is larger than a maximum diameter of the leg portion.

5. A rubber plug for a vial container according to claim 1, wherein the base end side portion has another ring-shape recess inside the convex portion.

* * * * *